United States Patent Office 2,787,886
Patented Apr. 9, 1957

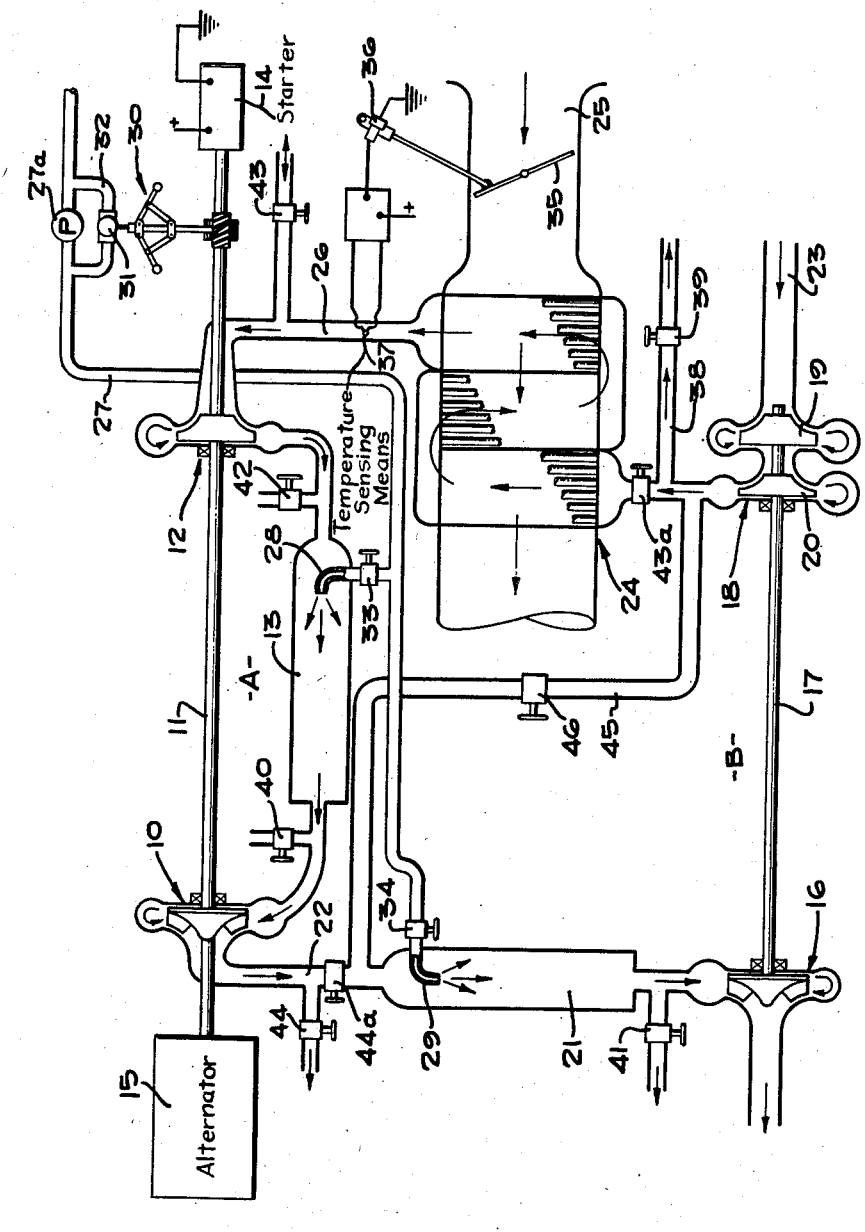

2,787,886

AIRCRAFT AUXILIARY POWER DEVICE USING COMPOUNDED GAS TURBO-COMPRESSOR UNITS

Homer J. Wood, Sherman Oaks, Calif., assignor to The Garrett Corporation, Los Angeles, Calif., a corporation of California Continuation of application Serial No. 175,227, July 21, 1950. This application November 17, 1951, Serial No. 256,890

1 Claim. (Cl. 60—39.17)

The present invention relates generally to power devices; and is more particularly concerned with a packaged power unit in which a plurality of gas turbines are compounded for operation at relatively high altitudes. Such power units are particularly advantageous of use in connection with aircraft as a source of power independent of the main aircraft engines for the driving of alternators and other power driven auxiliaries.

This application is a continuation of my copending application for Gas Turbine Power Unit, Serial No. 175,227, filed July 21, 1950, now abandoned.

Heretofore, the utilization of the main aircraft engines for the driving of auxiliary devices such as alternators and other power operated equipment has in main been unsatisfactory, resulting in inefficient operation and lacking in desired flexibility.

In an endeavor to overcome the inherent disadvantages as explained above, the provision of a separate power source, which may be operated independently of the main engines, has presented serious problems and difficulties have arisen in attempting to utilize a single power device, for example, a power device of the combustion type. If the single power device is designed to efficiently carry the required load at sea level or low altitude, the power output of the device will be insufficient at higher altitudes. Conversely, if the single power device is designed to efficiently carry the required load at a predetermined altitude, the unit will operate inefficiently at low altitudes or sea level and have excess capacity which will be wasted and is not readily available for other useful purposes. Moreover, such a device would also be so large in physical dimensions as to make it impracticable for installation in the limited spaces of aircraft.

With the above in mind, the present invention in its broad concept has for one object the provision of a compact efficient power unit of relatively small physical size, which is susceptible of flexible operation, which is operable independently of the main engines, and which is so arranged that at low altitudes excess pressurized air will be available for driving air actuated power devices and other desired purposes.

A further object is to provide a power package unit for aircraft wherein a plurality of gas turbine driven compressor units are connected for compound combined substantially full load operation at a predetermined altitude so as to permit both turbines and connected compressors to be designed for peak efficiency under altitude operating conditions, and at lower altitudes permit one of the turbines and its connected compressor to be utilized for furnishing pressurized air for other purposes, such as main engine starting or for other air turbine accessory drive applications.

A still further object is to provide in a packaged power unit, a plurality of compounded combustion turbines in which an air pumping device for one of the turbines serves as a supercharger for the other turbine unit at high altitude operation, and further so arranged that at low altitude or sea level, the turbines may be independently operated as conventional open cycle gas turbines which may be utilized to meet low power demands for prolonged periods of time, such as might be encountered under non-flight conditions.

Briefly, the present invention comprises a packaged power unit having a substantially constant speed main gas turbine which is connected with the load device such as an alternator or other means, and also drives a combustion air compressor. This main unit is compounded with a secondary gas turbine which drives another air compressor having its outlet connected through a heat exchanger to the inlet of the compressor driven by the main turbine. These two compressors cooperate to furnish combustion air for both turbines, the secondary turbine having its combustion chamber inlet connected to receive the exhaust from the main turbine. Fuel is supplied to the combustion chambers from a common source controlled in response to speed variations of the main turbine, the second turbine being a free floating unit whose speed will automatically vary to seek a flow balance in the system.

With such an arrangement, the secondary turbine and compressor act as a supercharger for the main unit for altitude operation, and may be utilized to furnish pressurized air for power and other purposes at low altitude or sea level operation.

Further objects of the invention will be brought out in the following part of the specification, wherein detailed description is for the purpose of fully disclosing the invention without placing limitations thereon.

Referring to the accompanying drawing, which is for illustrative purposes only, the single figure schematically illustrates a power unit embodying the features of the present invention.

As shown, the packaged power unit of the present invention comprises a main turbo-compressor unit A which is compounded for operation with a secondary turbo-compressor unit B for combined operation under altitude conditions, and which may be independently utilized at relatively low altitude or sea level for independent operation.

The main unit A embodies a hot wheel turbine 10 connected through a driving shaft 11 with a compressor 12 for furnishing combustion air to the turbine combustion chamber 13.

The shaft 11 is shown as being connected at one end to a suitable starter, as indicated at 14, and is also connected for driving a connected load which has been illustrated as being an alternator 15, but which may of course be any other desired power driven device or equipment.

The main turbo-compressor unit A is compounded with the secondary turbo-compressor unit B, the latter unit embodying a turbine 16 which has a driving connection through a drive shaft 17 with a compressor 18 of multi-stage type, in this instance having a first stage 19 and second stage 20. This turbine has a combustion chamber 21 which is connected to receive at its inlet, the exhaust gases from the main turbine 10 through a connecting duct 22.

The compressor 18 has an inlet 23 for supply of ambient air for combustion purposes. The compressor outlet connects with a heat exchanger, as generally indicated at 24, in which the air of the compressor 18 is conducted into heat exchange relation with ambient cooling air which may be supplied from an appropriate source such as a ram duct 25 to the heat exchanger. The combustion air is conducted through a duct 26 from the combustion air outlet of the heat exchanger 24 to the inlet of compressor 12 which is connected to supply air to the combustion chamber 13 and thence to turbine 10.

The main turbo-compressor unit A is essentially arranged to operate at a constant speed. For controlling this unit, means are provided for regulating fuel supply to the combustion chambers 13 and 21 of the turbines 10 and 16. Fuel from a suitable source of supply is distributed through a conduit 27 by a pump 27a driven by a suitable power means (not shown). The conduit 27 supplies fuel to nozzles 28 and 29 respectively in the combustion chambers 13 and 21. The supply of fuel is made dependent upon the speed of the main turbo-compressor unit A. This is accomplished by providing a speed responsive governor 30 which is driven from the shaft 11, this governor being connected with a valve 31 arranged to control flow through a pump bypass connection 32 in such manner that when the speed of the turbo-compressor unit tends to rise above predetermined normal value, the governor will act through the valve control to cut down the supply of fuel, and conversely when the speed drops below the normal value, the governor and valve will operate to increase the supply of fuel and restore the unit speed to normal operating value. Regulating valves 33 and 34 or other suitable means are associated with the nozzles 28 and 29 so that the apportionment of fuel between the nozzles may be adjusted to desired values.

In the arrangement shown, a valve 35 is arranged in the cooling air intake of the heat exchanger 24, this valve being operatively connected to an actuator 36 which is controlled in response to temperature sensing means 37 in the flow path of combustion air between the heat exchanger and the compressor 12 in duct 26. Thus, the inlet air to compressor 12 may be maintained at predetermined temperature value.

Briefly, the operation is as follows: Ambient air enters compressor 18 where it receives two stages of compression and is then discharged into the heat exchanger 24 where it is cooled by ambient cooling air. The pressurized air is then delivered through duct 26 to the compressor 12 where it receives an additional stage of compression. From this compressor the air passes to combustion chamber 13 where fuel is introduced through nozzle 28 and burned to heat the pressurized air to a high temperature. The heated air is then conducted to the turbine 10 where it is expanded and the energy thus extracted utilized to drive compressor 12 and the connected load, such as the alternator 15. From the turbine 10 the exhaust thereof is conducted to the combustion chamber 21 of turbine 16 where fuel is again introduced and burned so as to heat the air again to a high temperature. This heated air is delivered to turbine 16 where it is again expanded to ambient pressure and discharged as exhaust.

The main turbo-compressor unit operates at substantially constant speed, but with the above arrangement the secondary turbo-compressor unit B provides a free floating unit whose speed will automatically vary to seek a flow balance in the system. The turbo-compressor units are so designed that at a predetermined critical altitude, all the capacity of the secondary turbo-compressor unit B will be required to meet the rated load demand on the system. However, at low altitude or sea level, the secondary turbo-compressor unit will have more available capacity than is required to meet the rated load demand on the system.

Provision is therefore made whereby the excess capacity of the secondary turbo-compressor unit may be utilized and not wasted. For such purpose, a bleed air line 38 is connected with the flow path between the compressor 18 and the heat exchanger 24, and a shut-off valve 39 provided whereby pressurized air may be confined to the system or bled-off from compressor 18 for use in starting main engines or for other air turbine accessory drive applications, as may be arranged.

Provision is made also for air or hot gas extraction at other points for accessory use. Valves 40 and 41 provide hot gas at different pressure levels. Valve 42 provides compressed air at a higher pressure than valve 39.

As a further adjunct, shut off valves 43 and 44 are respectively provided in branch connections to ducts 26 and 22. By opening the valves 43 and 44 and closing unit isolating valves 43a at the inlet of heat exchanger 24, unit isolating valve 44a in duct 22 and valve 34 to combustion chamber 21, all of the system may be cut out except the constant speed main turbo-compressor unit A which may then be operated as a conventional open cycle gas turbine and utilized to meet low power demands for prolonged periods of time, such as might be encountered under non-flight conditions.

Optional bypass line 45 and valve 46 may be used to provide independent operation of unit B as an independent compressed air or gas source, if desired. To operate unit B in this manner, valve 46 would be opened and the isolating valves 43a and 44a closed.

By compounding two turbo-compressor units in the manner explained above, a packaged gas turbine power unit is obtained which is of smaller physical size than that which would be necessary to operate under corresponding conditions, thus providing a unit which may readily be mounted in the usual confined spaces of aircraft. Also the respective turbo-compressor units may be designed for high efficiency and utilized under conditions such that excess capacity may be utilized and not wasted; and in which the turbo-compressor units are flexibly and readily adapted for the furnishing of power for desired purposes.

I claim:

An auxiliary power device for aircraft, comprising: a compound connected main gas turbo-compressor unit adapted to drive a connected load at constant speed, and a free floating secondary gas turbo-compressor unit, said units having their compressor components connected in series stages with the intake of the first of said series stages connected to ambient atmosphere subject to variable altitude pressure changes and the outlet of the last of said series stages being connected to furnish combustion air successively to the turbine components, said units being arranged to respectively develop, under combined operation, full rated power at a predetermined high altitude condition; a heat exchanger in the connection between said compressor components of said units; and air bleed passages in said connection upstream and downstream from said heat exchanger for bleeding excess pressurized air at different temperatures from the compressor component of the secondary unit for pneumatic power purposes during low altitude operation.

References Cited in the file of this patent

UNITED STATES PATENTS

| | | |
|---|---|---|
| 1,371,444 | Sherbondy | Mar. 15, 1921 |
| 2,074,803 | Noble | Mar. 23, 1937 |
| 2,095,991 | Lysholm | Oct. 19, 1937 |
| 2,115,112 | Lysholm | Apr. 26, 1938 |
| 2,115,338 | Lysholm | Apr. 26, 1938 |
| 2,119,402 | Puffer | May 31, 1938 |
| 2,245,954 | Anxionnaz | June 17, 1941 |
| 2,318,905 | Traupel | May 11, 1943 |
| 2,399,046 | Larrecq | Apr. 23, 1946 |
| 2,418,911 | Smith | Apr. 15, 1947 |
| 2,425,000 | Paget | Aug. 5, 1947 |
| 2,544,235 | Pfenninger | Mar. 6, 1951 |
| 2,580,591 | Pouit | Jan. 1, 1952 |

FOREIGN PATENTS

| | | |
|---|---|---|
| 411,787 | Great Britain | June 14, 1934 |
| 210,653 | Switzerland | Oct. 16, 1940 |
| 253,088 | Switzerland | Dec. 1, 1948 |